Oct. 23, 1945.   G. WALTHER ET AL.   2,387,625
FIFTH WHEEL CONSTRUCTION
Filed Aug. 3, 1943
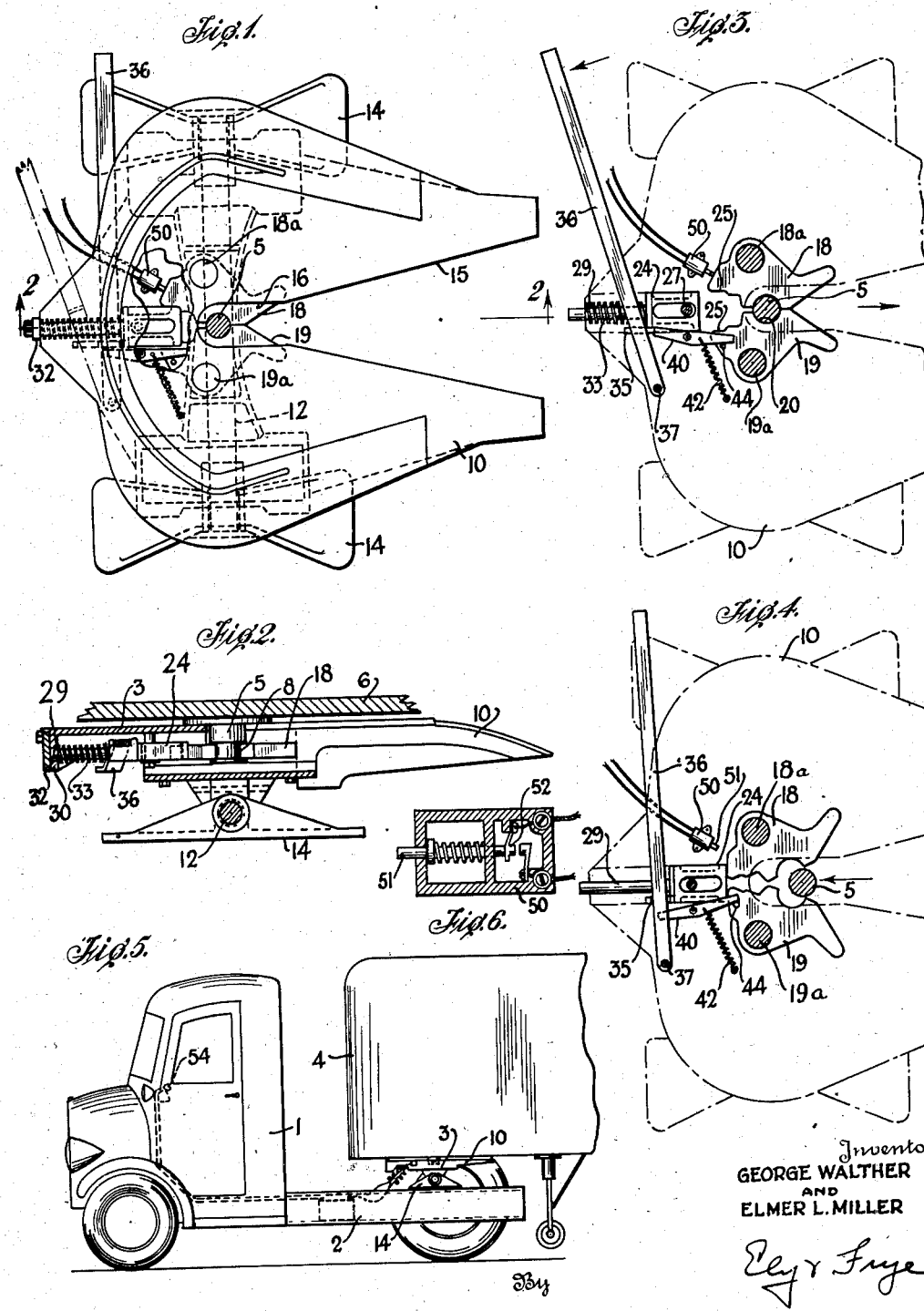
Inventor
GEORGE WALTHER
AND
ELMER L. MILLER Patented Oct. 23, 1945

2,387,625

UNITED STATES PATENT OFFICE 2,387,625

FIFTH WHEEL CONSTRUCTION

George Walther, near Dayton, and Elmer L. Miller, Dayton, Ohio, assignors to The Dayton Steel Foundry Company, Dayton, Ohio, a corporation of Ohio Application August 3, 1943, Serial No. 497,248

6 Claims. (Cl. 177—311)

The present invention relates to the construction and operation of coupling devices such as employed for connecting a tractor or truck unit and a trailer or semi-trailer. This type of mechanism is well known and is used in many forms, the present application showing the manner in which the invention is incorporated in and applied to one type of fifth wheel construction.

One of the principal objections to trailer couplings such as now widely employed is that it is very difficult for the truck operator before starting the truck to determine whether the truck and trailer are properly connected. This is due to the fact that the kingpin on the trailer cannot be seen by the operator after the tractor is under the trailer. Much time is often lost and the load or equipment damaged because the operator may start up the truck unit before the kingpin is properly coupled.

It is the object of the invention to construct and combine with a fifth wheel construction of any standard or accepted design a telltale device by which the operator may readily determine that the two units are coupled before starting up the truck.

In the drawing and description there is illustrated one standard form of fifth wheel construction in which the invention is incorporated, but it will be understood that the invention may readily be incorporated with any other type of coupling, the necessary changes or modifications to adapt the invention to other forms of couplings being within the skill of any mechanic. It is also obvious that other changes and adaptations of the invention may be made within the scope of the invention as set forth in the appended claims.

In the drawing in which the best known or preferred form of the invention is shown:

Fig. 1 is a plan view of a coupling or fifth wheel construction in which a portion of the base or platform of the coupling is broken away to show the underlying parts, the kingpin being indicated as in its proper coupled relation;

Fig. 2 is a section on the line 2—2 of Fig. 1;

Fig. 3 is a view showing the locking member withdrawn and the kingpin in coupling relation, as the parts are positioned prior to uncoupling;

Fig. 4 is a view showing the same parts with the kingpin only partially seated, at which time the telltale will indicate the improper seating of the kingpin;

Fig. 5 is a side elevation of a truck and trailer properly connected; and

Fig. 6 is a detail of the switch associated with the telltale.

In the drawing, I represents any standard form of truck or tractor unit having a platform 2 on which the fifth wheel unit, indicated by the numeral 3, is attached. The trailer 4 of any desired type is provided with the usual kingpin 5 attached to its forward floor 6, this pin being provided with a reduced portion 8 which directly engages the jaws of the coupling device.

The fifth wheel includes the platform or base 10 which is pivotally mounted at 12 on supporting brackets 14 attached to the platform. When there is no load on the fifth wheel the platform 10 will tilt so that the truck may be backed under the forward end of the trailer.

The base or platform 10 is provided with an opening 15 the walls of which converge from the rear of the plate to a central slot 16 beneath which are located the two pivoted jaws 18 and 19 which constitute the coupling elements. These jaws are pivoted at 18ª and 19ª, respectively, to the under side of the base 10. These jaws close about the kingpin when it is properly seated and are provided with flaring, guiding surfaces which lead to the central opening 20 between the jaws into which the reduced central portion 8 of the kingpin fits.

As the kingpin, moving in the direction of the arrow, enters the slot 16, as shown in Fig. 4, it moves into the opening 20, and the continued backward movement of the truck causes the kingpin to strike the jaws which close about the kingpin into proper coupling relation, as shown in Fig. 1.

In order to lock the jaws about the kingpin, there is provided a locking plunger or bolt 24 which is movable to locking position between shoulders 25 formed on the front ends of the jaws as shown in Fig. 1. This locking plunger is mounted for sliding movement over a pin 27 carried on the under side of the base and entering a slot in the plunger. The opposite end of the plunger is provided with an elongated guiding pin 29 which is movable in a hole formed in a web 30 as the forward end of the base plate 10. A locking plate or latch 32 is mounted on the base so that it can be moved over the end of the pin, thus insuring that the plunger is not accidentally withdrawn after the coupling operation is completed. A spring 33 surrounds the pin 29 and lies between the web 30 and the head of the plunger and tends to force the plunger against the forward ends of the jaws and then to its locking position when the jaws are closed. On the plunger 24 is provided a tailpiece 35 which is slotted to receive an operating lever 36 pivoted to the base plate at 37 so that by moving the lever to the left, as shown in Fig. 3, the locking plunger is withdrawn and the coupling jaws are free to move so as to release the kingpin as it moves in the direction of the arrow in Fig. 3 while the tractor is driven forward to uncouple the trailer.

In order to hold the locking plunger 24 in its withdrawn position against the force of the spring 33 so that the jaws will be free to move, one side of the plunger is provided with an elongated notch or recess, the forward end of which is engaged when the plunger is fully withdrawn by the end of a pivoted latch 40 mounted on the base plate and moved toward locking position by the coiled spring 42. The opposite end of the latch lies in the path of a pin 44 on the coupler jaw 19. As the kingpin 5 spreads the jaws 18 and 19 during uncoupling, the pin 44 will strike the latch 40, releasing the plunger 24 which will rest upon the ends of the jaws holding them in open position until they are closed by the entering movement of the kingpin, whereupon the spring 33 will move it into its locked position.

As will be seen, the moving parts of the coupling are all concealed within the fifth wheel construction and the operator is unable to determine whether the coupling is properly made before he moves the truck. To prevent the occurrence of accidents by premature forward movement of the tractor, there is provided a device which will not only indicate when the pin 5 is improperly seated, as, for example, in the position of the parts as shown in Fig. 4, but will also indicate any movement of the jaws 18 and 19 by the kingpin. This telltale will indicate that the jaws are fully closed. Thus, except as a result of inattention on the part of the operator, the tractor will not be started up when the kingpin is wholly outside of the jaws or partially entered. The arrangement and design of the parts, therefore, constitute a simple, but also a very effective device for the purposes set forth.

While the safety device may be incorporated in a number of embodiments of the invention, in the preferred form shown an electric switch box 50 is attached to the under side of the base plate 10 having a spring-actuated pin 51 which is so located that when the jaws are fully closed, the pin is moved inward by one of the jaws, here shown as the jaw 18. This will close the open switch 52 within the box and will light a telltale lamp 54 at some convenient point, preferably the instrument panel of the tractor 1. When, however, the jaws are spread, the jaw 18 is withdrawn from the pin 51 which moves so that the switch is open and the light extinguished.

In making the coupling or hitch, the operator, as he backs the truck unit under the trailer, will watch the light which is extinguished until the jaws close about the pin.

It is possible without entirely defeating the objects of the invention to have the telltale light glow when the jaws are spread apart, but this would cause the light to be on during the entire time that the truck is idle. The reverse operation, as described above, is preferred for if the extinguishment of the light were relied upon to indicate proper coupling, the operator might be under a misapprehension as to the true conditions, as, for example, if the lamp had burned out. In the invention as shown, if the lamp is out, the operator would normally critically examine the coupling and if that was intact, he would then know that the fault was in the lamp.

What is claimed is:

1. In a fifth wheel construction, a kingpin, a pair of movable coupling jaws adapted to be spread apart by the kingpin as it is withdrawn from the jaws and to close about the kingpin when the coupling is fully made, an alarm device, and an electric switch connected to the alarm device located in the path of one of said jaws and directly actuated thereby.

2. In a trailer-tractor provided with a fifth wheel construction, a kingpin, a pair of movable coupling jaws adapted to be spread apart by the kingpin as it is withdrawn from the jaws and to close about the kingpin when the coupling is fully made, and an alarm device located in the cab of the trailer-tractor and having an operating means located within the path of one of said jaws and actuated upon the entrance of the kingpin between the jaws.

3. In a device of the character set forth, a truck and a trailer, a fifth wheel on the truck and a kingpin on the trailer, a pair of jaws on the truck between which the kingpin is received when the vehicles are coupled, a lamp on the truck having a circuit and a switch in said circuit, said switch being mounted adjacent one of said jaws and operated by the movement thereof.

4. In a device of the character set forth, a truck and a trailer, a fifth wheel on the truck and a kingpin on the trailer, a pair of jaws on the truck between which the kingpin is received when the vehicles are coupled, a lamp on the truck having a circuit and a spring switch in said circuit, said switch being mounted adjacent one of said jaws and in contact with the jaw when the latter is closed upon the kingpin whereby said circuit is closed only when the jaws are closed.

5. In a fifth wheel construction, a kingpin, a movable coupling jaw actuated by the kingpin as the coupling is being made, and an alarm separate from the fifth wheel so designed and constructed as to be operated by the kingpin as it moves over the surface of the jaw.

6. The combination of a truck, a fifth wheel on the truck, a trailer, the forward end of which is supported on the fifth wheel when the truck and trailer are in coupled relation, a king pin on the trailer, a pair of movable locking jaws on the fifth wheel, said jaws being moved by the king pin when the truck and the trailer are being brought into coupling relation and closing about the king pin to couple the truck and the trailer, an electric lamp on the truck, a switch for said lamp located on the fifth wheel, the switch being responsive to the position of the jaws and actuated directly by the movement thereof to light or extinguish the lamp.

GEORGE WALTHER.
ELMER L. MILLER.